(12) United States Patent
Weinlich

(10) Patent No.: US 11,433,811 B2
(45) Date of Patent: Sep. 6, 2022

(54) METHOD AND DEVICE FOR OPERATING A VIDEO MONITORING SYSTEM FOR A MOTOR VEHICLE

(71) Applicant: Continental Automotive GmbH, Hannover (DE)

(72) Inventor: Andreas Weinlich, Munich (DE)

(73) Assignee: CONTINENTAL AUTOMOTIVE GMBH, Hannover (DE)

(*) Notice: Subject to any disclaimer, the term of this patent is extended or adjusted under 35 U.S.C. 154(b) by 0 days.

(21) Appl. No.: 16/963,637

(22) PCT Filed: Jan. 10, 2019

(86) PCT No.: PCT/EP2019/050578
§ 371 (c)(1),
(2) Date: Jul. 21, 2020

(87) PCT Pub. No.: WO2019/145162
PCT Pub. Date: Aug. 1, 2019

(65) Prior Publication Data
US 2021/0061173 A1    Mar. 4, 2021

(30) Foreign Application Priority Data
Jan. 26, 2018  (DE) .................... 10 2018 201 217.2

(51) Int. Cl.
*B60R 1/00*         (2022.01)
*H04N 7/18*         (2006.01)

(52) U.S. Cl.
CPC .............. *B60R 1/002* (2013.01); *H04N 7/183* (2013.01); *B60R 2300/303* (2013.01);
(Continued)

(58) Field of Classification Search
CPC .............. B60R 1/002; B60R 2300/307; B60R 2300/802; B60R 2300/306; B60R 2300/303; H04N 7/183
See application file for complete search history.

(56) References Cited

U.S. PATENT DOCUMENTS

| 9,160,981 B2 | 10/2015 | Nishiguchi | .................... 348/148 |
| 10,000,155 B2 | 6/2018 | Schrepfer | ................. B60R 1/00 |

(Continued)

FOREIGN PATENT DOCUMENTS

| DE | 10 2010 032 411 | 2/2012 | ............... B60R 1/08 |
| DE | 10 2013 214 368 | 1/2015 | ............... B60R 1/00 |

(Continued)

OTHER PUBLICATIONS

Search Report for International Application No. PCT/EP2019/050578, 11 pages, dated Mar. 21, 2019.

(Continued)

*Primary Examiner* — James M Pontius
(74) *Attorney, Agent, or Firm* — Slayden Grubert Beard PLLC

(57) ABSTRACT

Various embodiments include a method for operating a camera-monitor system for a motor vehicle, wherein the camera-monitor system has a side camera assigned to a longitudinal side of the motor vehicle to provide an image of surroundings of the motor vehicle. The method may include: specifying a region of interest in the surroundings; and transforming the image of the camera into a transformed image wherein the region of interest in the transformed image is arranged in a specified image region with a specified magnification independent of any change in relative position between the region of interest and the motor vehicle.

10 Claims, 3 Drawing Sheets

(52) U.S. Cl.
CPC ... *B60R 2300/306* (2013.01); *B60R 2300/307* (2013.01); *B60R 2300/802* (2013.01)

(56) References Cited

U.S. PATENT DOCUMENTS

| | | | | |
|---|---|---|---|---|
| 2008/0129844 A1* | 6/2008 | Cusack | ............. | H04N 5/23229 348/241 |
| 2009/0195652 A1* | 8/2009 | Gal | ............. | F41G 3/165 348/148 |
| 2012/0162427 A1* | 6/2012 | Lynam | ............. | H04N 5/23238 348/148 |
| 2014/0160276 A1 | 6/2014 | Pliefke | ............. | B60R 1/00 |
| 2018/0191954 A1* | 7/2018 | Pan | ............. | H04N 13/246 |

FOREIGN PATENT DOCUMENTS

| | | | | |
|---|---|---|---|---|
| DE | 10 2014 018 040 | | 6/2016 | ............... B60R 1/00 |
| DE | 10 2015 218 033 | | 3/2017 | ............... B60R 1/00 |
| DE | 10 2016 216 962 | | 12/2017 | ............... B60R 1/00 |
| EP | 2 555 518 | | 2/2013 | ............... H04N 7/18 |
| EP | 2 763 410 | | 8/2014 | ............... H04N 7/18 |
| EP | 3 138 736 | | 3/2017 | ............... B60R 1/00 |
| JP | 2013154869 A | | 8/2013 | ............... B60R 1/06 |
| JP | 2013 207746 | | 10/2013 | ............... H04N 7/18 |
| WO | 2015 013311 | | 1/2015 | ............... B60R 1/00 |

OTHER PUBLICATIONS

Office Action for DE Application No. 10 2018 201 217.2, 6 pages, dated Jun. 26, 2018.
Japanese Office Action, Application No. 2020540592, 4 pages, dated Oct. 18, 2021.
Anonymous, "Digital Mirror Replacement System for Optimum View Field," Assistance Systems, MAN Germany, 10 pages (German w/ English translation).

* cited by examiner

METHOD AND DEVICE FOR OPERATING A VIDEO MONITORING SYSTEM FOR A MOTOR VEHICLE

CROSS-REFERENCE TO RELATED APPLICATIONS

This application is a U.S. National Stage Application of International Application No. PCT/EP2019/050578 filed Jan. 10, 2019, which designates the United States of America, and claims priority to DE Application No. 10 2018 201 217.2 filed Jan. 26, 2018, the contents of which are hereby incorporated by reference in their entirety.

TECHNICAL FIELD

The present relates to camera-monitor systems. Various embodiments include motor vehicles and/or apparatuses to operate a video monitoring system.

BACKGROUND

Motor vehicles, for example trucks and buses, conventionally have exterior mirrors. Mirror replacement systems in which the fields of view of the typical exterior mirrors are imaged by way of a camera and a monitor are also known. Such mirror replacement systems are also referred to as camera-monitor systems.

SUMMARY

Various embodiments of the teachings herein include methods for operating a camera-monitor system for a motor vehicle that enables reliable operation and/or apparatuses for operating a camera-monitor system that enables reliable operation. For example, some embodiments include a method for operating a camera-monitor system (100) for a motor vehicle (101), wherein the camera-monitor system (100) has a camera (102) which is assigned to a longitudinal side (106, 107) of the motor vehicle and which is embodied to provide an image of surroundings (105) of the motor vehicle (101), comprising: specifying a region of interest (111) in the surroundings (105), and transforming the image of the camera (102) into a transformed image (300) such that the region of interest (111) in the transformed image (300) is arranged in a specified image region (301) with a specified magnification, independently of a change in the relative position of the region of interest (111) in the surroundings (105).

In some embodiments, specifying the region of interest (111) comprises: ascertainment of a specified image content, ascertainment of vehicle data, and specification by means of an input apparatus.

In some embodiments, the region of interest (111) is a region of a trailer rear edge (112) of a trailer (109) of the motor vehicle (101).

In some embodiments, the method further comprises: transforming the image such that the specified regions of the surroundings (105) in the transformed image (300) are imaged with different magnifications in specified image regions (301-306), and changing the respective positions of the image regions (301-306) in the transformed image (300) on the basis of the change in the relative position of the region of interest (111) in the surroundings (105).

In some embodiments, the method further comprises transforming the image of the camera (102) into the transformed image (300) such that surroundings presented in the transformed image remain unchanged, independently of a change in the relative position of the region of interest (111) in the surroundings (105).

In some embodiments, the method further comprises transforming the image with a continuously changing compression factor such that a continuous transition is presented between image regions (301-306) immediately adjoining one another.

In some embodiments, the method further comprises rectifying the image prior to the transformation.

In some embodiments, the method further comprises composing the image from a plurality of input images.

In some embodiments, the camera-monitor system (100) has two cameras (102, 103), which are assigned to the common longitudinal side (106, 107) of the motor vehicle (101) and which are each embodied to provide an image of the surroundings (105) of the motor vehicle (101), with the imaged surroundings (105) of the images partly overlapping.

As another example, some embodiments include an apparatus for a motor vehicle, said apparatus being embodied to carry out a method as described above.

BRIEF DESCRIPTION OF THE DRAWINGS

Advantages, features, and developments can be gathered from the following examples which are explained in conjunction with the figures. Elements that are identical, of identical type and act identically may be provided with the same reference signs through the figures. In the drawings.

DETAILED DESCRIPTION

Figure 1:
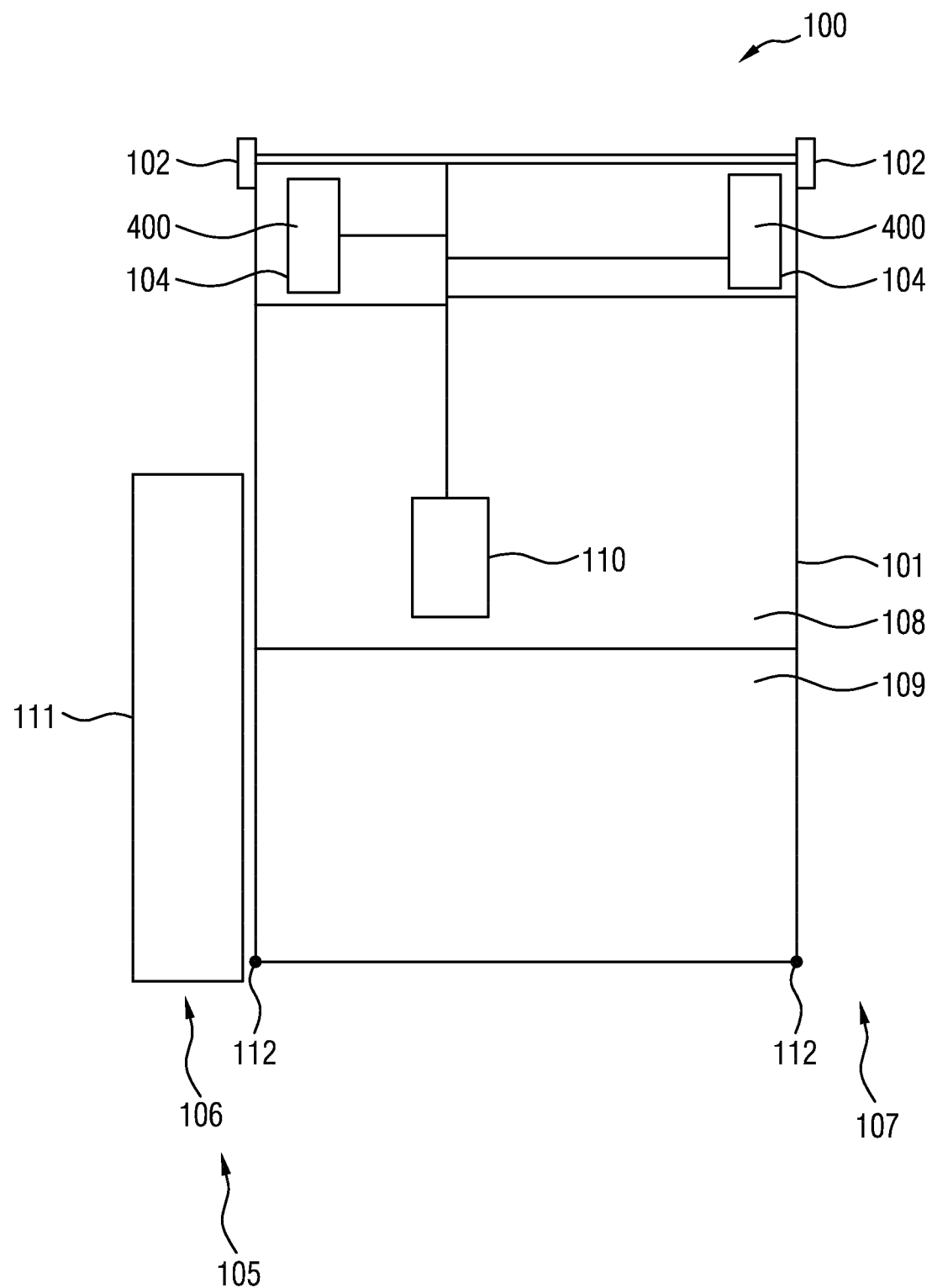
FIG. 1 shows a schematic illustration of a motor vehicle with a camera-monitor system incorporating teachings of the present disclosure.

In some embodiments, the camera-monitor system has a camera that is assigned to a longitudinal side of the motor vehicle. The camera provides an image of surroundings of the motor vehicle. A region of interest in the surroundings is specified. The image of the camera is transformed into a transformed image such that the region of interest in the transformed image is arranged in a specified image region, independently of a change in the relative position of the region of interest in the surroundings. The specified image region has a specified magnification. In the transformed image, the region of interest is presented, in particular, with an unchanged magnification, independently of a change in the relative position of the region of interest in the surroundings.

By means of the camera monitor system, it is possible to present on a monitor of the camera-monitor system the surroundings of the motor vehicle to a driver of the motor vehicle such that it is possible to dispense with conventional external mirrors. In the case of motor vehicles with a trailer, there can be significant articulation angles between the tractor and trailer, for example during maneuvering, in particular during reversing. The trailer rear edge then moves in the direction of a central region of the image. To avoid a majority of the image presented on the monitor merely imaging a side surface of the trailer, the image of the camera is transformed accordingly.

In some embodiments, the region of interest is a region directly next to the trailer. By way of example, the region of interest corresponds to the statutory Class II if trailer and tractor are aligned with one another. By way of example, the region of interest is part of the statutory Class II if trailer and tractor are aligned with one another. If the tractor and trailer are at an angle to one another, the region of interest shifts in accordance with an articulation angle between the tractor and the trailer. In the transformed image, the region of interest is still presented in the specified image region. To this end, the trailer is presented with more compression in the transformed image than the surroundings next to the trailer, for example. As a result, the trailer taking up an unwanted large region of the transformed image presented on the monitor is avoidable, even in the case of significant articulation angles. Even if the region of interest shifts in the surroundings, for example because the trailer swings out, the image is transformed in such a way that a similar image division as in the case of a straight alignment of the tractor and of the trailer remains.

In some embodiments, specifying the region of interest comprises an ascertainment of a specified image content, for example the trailer rear edge. In some embodiments, vehicle data are ascertained in order to specify the region of interest. This may comprise a trailer position provision by way of a system input such as CAN, or other data that are present in the control system of the motor vehicle. In some embodiments, the region of interest is specified by means of an input apparatus, in particular by the user of the motor vehicle. The input apparatus comprises a joystick, a touchscreen and/or gaze detection, for example. This allows the user of the motor vehicle to specify a region in the surroundings which should always be presented in the specified image region of the transformed image and which, in particular, should not be covered by the trailer.

In some embodiments, the image is transformed such that the specified regions of the surroundings in the transformed image are imaged with different magnifications in specified image regions. The respective positions of the image regions in the transformed image are changed on the basis of the change in the relative position of the region of interest in the surroundings. By way of example, an image region with a weak horizontal and vertical compression, which at least partly covers the statutory Class II, is shifted horizontally into the direction of the center of the image in the transformed image. A vertical shift is also possible. Accordingly, the regions next to the shifted region are more compressed horizontally in the case of a horizontal shift. Overall, a proportion of the presented surroundings in relation to the proportion of the presented motor vehicle in the transformed image remains virtually unchanged, particularly in the image region with little compression.

In some embodiments, the magnification in the image region immediately adjoining the image region imaging the region of interest is changed if there is a change in the position of the image regions. This image region is, in particular, the image region that also images part of the trailer of the motor vehicle. In this image region, the surroundings are significantly compressed horizontally. Consequently, it is possible to image the adjoining image region, which at least partly images the region of interest, in such a way in the transformed image that the region of interest is arranged in the specified image region.

In some embodiments, the image is rectified prior to the transformation. By way of example, the input image from the camera is rectified in such a way that the known distortions on account of the lenses employed are compensated.

In some embodiments, the image is composed from a plurality of input images. By way of example, the camera-monitor system has two cameras which are assigned to the common longitudinal side of the motor vehicle and which are each embodied to provide an image of the surroundings of the motor vehicle, with the imaged surroundings of the images partly overlapping.

By way of example, the image is composed from the input images of the two cameras. By way of example, use is made of a camera with a high focal length and a small viewing angle, for example with a telephoto lens. This camera serves to image surroundings next to and behind the motor vehicle. By way of example, use is made of a second camera that has a long focal length and a large viewing angle, for example with a wide-angle lens. By way of example, the latter serves to record a region of the front corner of the motor vehicle or of the tractor, for example in order to image statutory Class V on the monitor of the camera-monitor system.

In some embodiments, the apparatus for the motor vehicle which is embodied to carry out the method is, for example, part of a controller for the motor vehicle (ECU, electronic control unit). Advantages, features and further developments described for the method also apply to the apparatus, and vice versa.

FIG. 1 shows a schematic illustration of a motor vehicle 101 according to one exemplary embodiment from above. The motor vehicle 101 is, for example, a truck with a tractor 101 and a trailer 109. In some embodiments, the motor vehicle is a bus and/or a passenger car, in particular with the trailer 109.

The motor vehicle 101 has a camera-monitor system 100 as a mirror replacement system. The camera-monitor system 100 has one camera 102 per side 106, 107 of the motor vehicle 101. The cameras 102 each serve to record surroundings of the respective assigned side 106, 107. According to further exemplary embodiments, a plurality of cameras are provided per side 106, 107, for example two or more cameras. According to further exemplary embodiments, the camera 102 is only arranged on one side of the sides 106, 107.

The camera-monitor system 100 has two monitors 104, which are assigned in each case to one of the sides 106, 107. During operation, a section of the surroundings 105 on the side 106, which section is recorded by the cameras 102, is presented on the assigned monitor 104 as an overall image 400. A section of the surroundings 105 is presented as an overall image 400, which is recorded by way of the camera 102 assigned to the side 107, on the monitor 104, which is assigned to the side 107. The overall image 400 thus differs on the two monitors 104.

The overall image 400 on the monitor 104 is in particular set up to present a mirror image of a conventional exterior mirror, in particular, to present further sections of the surroundings 105 that cannot be imaged with conventional exterior mirrors.

In some embodiments, there is an apparatus 110 with which the cameras 102 and the monitors 104 are coupled for the transmission of signals. The apparatus 110 is configured to control the cameras 102 and also the monitors 104. By way of example, the apparatus 110 is a controller or part of a controller of the motor vehicle 101.

In some embodiments, the image of the camera 102 is transformed in such a way that, in the case of a straight alignment of the tractor 108 and the trailer 109, a field of view presented in the overall image 400 is flush with the trailer 109. A region of interest 111 is specified next to the trailer 109. By way of example, the region of interest 111 is a region in the surroundings 105 that is of particular interest to a user of the motor vehicle 101 during operation, for example during maneuvering. By way of example, the region of interest 111 is specified in such a way that it is located next to the trailer 109 and, in particular, at a rear edge 112 of the trailer 109.

During maneuvering, particularly during reversing of the motor vehicle 101, there can be pronounced articulation angles between the tractor 108 and the trailer 109. By way of example, the trailer rear edge 112 then moves to the right. Conventionally, an image region of the overall image 400 which illustrates the region of interest 111 with great magnification in the case of a straight alignment of the trailer 109 with respect to the tractor 108 would consequently be largely or completely covered by the longitudinal side of the trailer 109. As a result, this region of the overall image becomes less useful to the driver of the motor vehicle 101.

In some embodiments, to reliably image the region of interest 111 in the overall image 400, independently of the articulation angle between the tractor 108 and the trailer 109, and in order to keep the proportion of the image containing useful information to the driver as large as possible, the division into, and the magnification in, different image regions of the overall image 400 is adapted during operation. Consequently, the proportion of the overall image 400 that is covered by the trailer 109 is kept as small and constant as possible.

Figure 2:
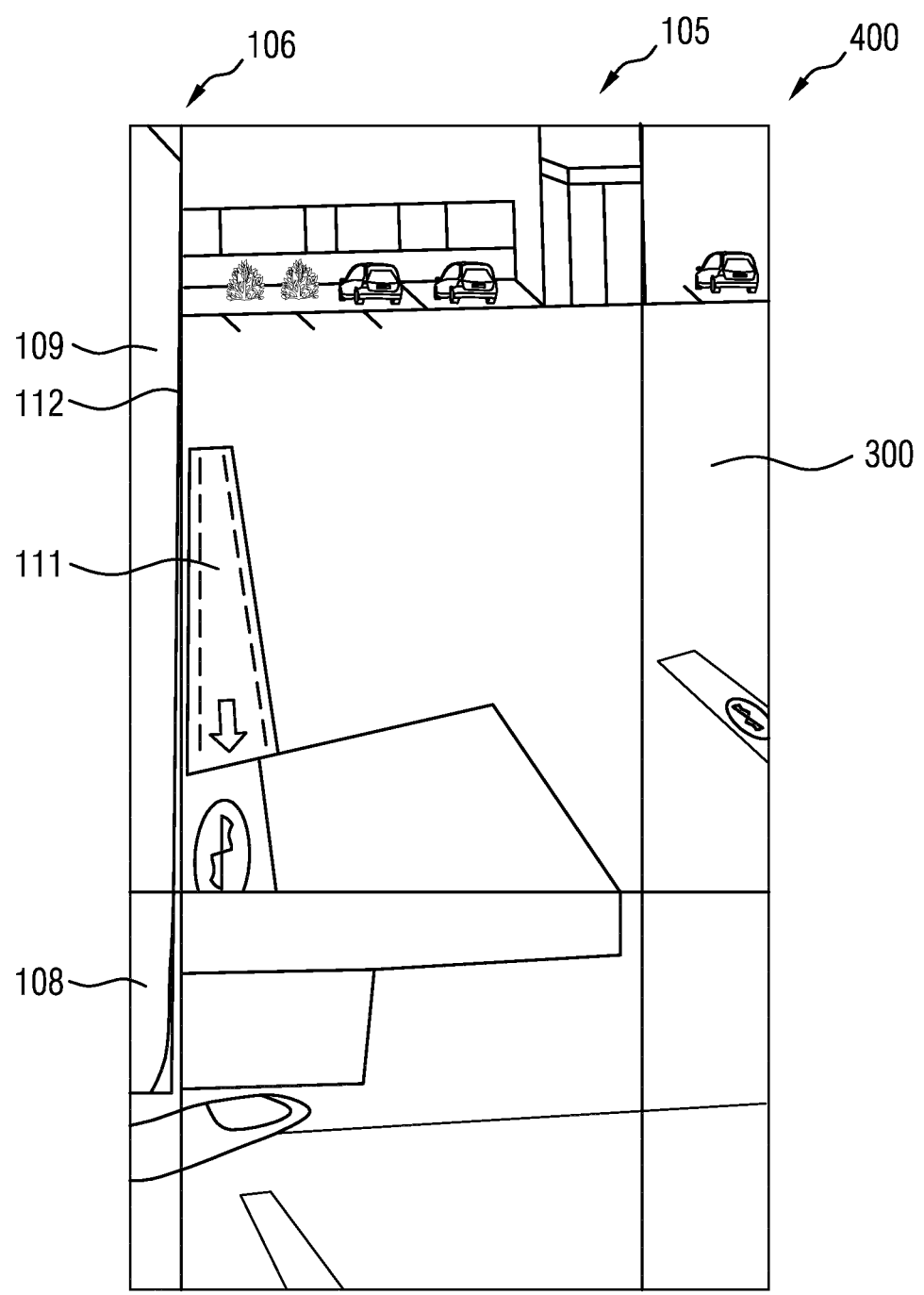
FIG. 2 shows a schematic illustration of an overall image incorporating teachings of the present disclosure.

FIG. 2 shows an overall image 400 according to one exemplary embodiment. The image of the camera 102 is transformed in such a way that the trailer 109 is only presented on the left-hand edge. The region of interest 111 is presented in an image region 301.

Figure 3:
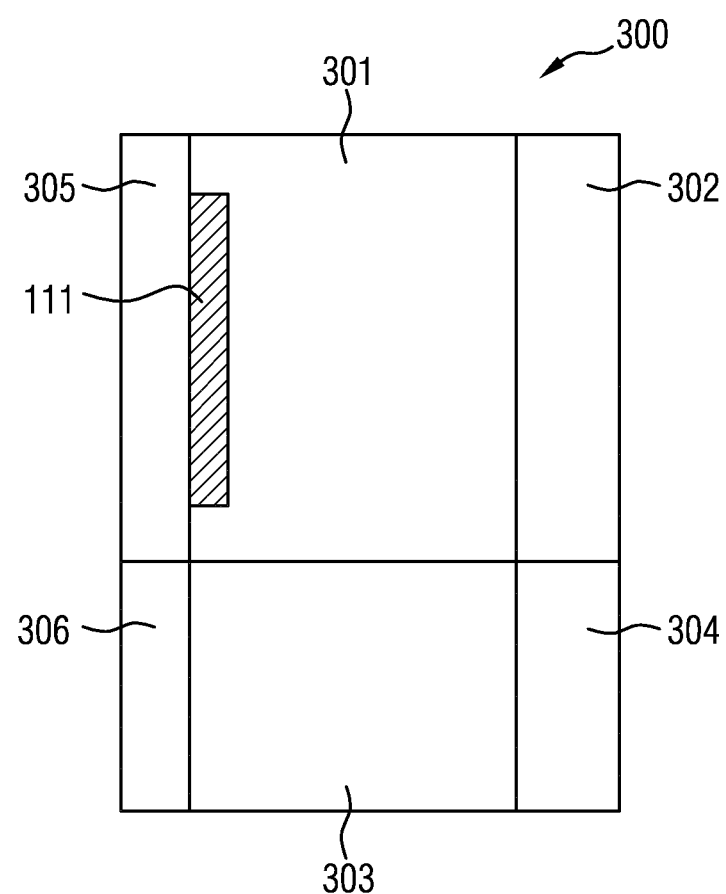
FIG. 3 shows a schematic illustration of image regions in the transformed image incorporating teachings of the present disclosure.

The overall image 400 is subdivided into image regions 301 to 306, as illustrated in FIG. 3. The magnification or the compression and distortion of the presentation of the surroundings 105 in the overall image 400 differs between image regions 301 to 306. In the case of a pronounced articulation angle between the tractor 108 and the trailer 109, the surroundings are significantly compressed in image region 305 in the transformed image 300 so that the trailer 109 takes up as little space as possible in the overall image 400. The image region 301 adjoining the image region 305 can consequently image the surroundings 105 with conventional magnification without the trailer 109 being presented in the image region 301 or without the image representation of the trailer 109 taking much too much space in the image region 301. Consequently, the region of interest 111 is always presented in the image region 301.

It is also possible to dispense with the image region 305 in the case of a straight alignment between the trailer 109 and the tractor 108. The image region 301 with a significant magnification images the trailer 109 at the edge and otherwise images the region of interest 111 and further parts of the surroundings 105. In the case of a significant articulation angle between the tractor 108 and the trailer 109, the trailer 109 would conventionally almost completely cover the image region 301. Therefore, the region 301 is shifted in the transformed image 300 and, additionally, the image region 305 is presented with a different magnification to the image region 301.

In some embodiments, the image regions 302 and 304 are significantly more compressed in the horizontal direction than the image regions 301 and 303. By way of example, the image regions 303 and 304 are significantly more compressed in the vertical direction than the image regions 301 and 302. By way of example, the input images for the image regions 301 and 302 are recorded using a camera with a telephoto lens. By way of example, the input images for the image regions 303 and 304 are recorded using a camera with a wide-angle lens. The transformed image 300 is composed from the input images from the two cameras. Consequently, the statutory Classes II, IV and V can be imaged and, in particular, further regions from the surroundings 105 can be imaged. By way of example, statutory Class II is presented in image regions 301 and 305.

In some embodiments, the region of interest 111 is specified relative to the motor vehicle 101, in particular relative to the trailer 109. Other options for specifying the region of interest 111 are also possible. By way of example, trailer edge detection is carried out using image information from the camera 102 and vehicle data. It is also possible for a trailer position provision to provide, for example, the articulation angle between the tractor 108 and the trailer 109 by way of a system input such as CAN. As an alternative or in addition thereto, a manual selection of the region of interest 111 is also possible; by way of example, the driver of the motor vehicle 101 chooses the region of interest 111 using an input apparatus such as a joystick, a touchscreen or gaze detection or other input apparatuses.

Depending on the information about the relative alignment of the trailer 109 with respect to the tractor 108, the camera field of view is repositioned in the individual regions 301 to 306. Even if the region of interest 111 is shifted in the input camera image, i.e., migrates to the right for example, the region of interest 111 continues to be presented in the image region 301 in the transformed image 300. In particular, the image region 301 is changed to this end. In particular, the relative position of the image region 301 is changed in the transformed image. In particular, the relative position of the image region 301 is changed in the overall image 400. By way of example, if the driver swings to the right and consequently the vehicle trailer bends in the direction of the image region 302 in the input image, the region cut out of the input image is changed in such a way that the trailer rear edge 112 is still presented almost completely at the edge in the transformed image 300 and the region of interest 111 continues to be presented in the image region 301. The trailer rear edge 112 is presented in the image region 305, which has a different magnification to the image region 301. Consequently, it is possible to present the trailer 109 with significant compression in the transformed image 300 and to present the region of interest 111 sufficiently large with a desired magnification.

The image region 301 in the overall image 400 is shifted to the right, for example, in order, firstly, to continue to realize a continuous transition to the image region 302 and, secondly, to be able to display the entire input image on the monitor 104, even in the case where the trailer 109 is angled relative to the tractor 108. To this end, new image regions 305 and 306 are displayed to the left of the image region 301 and to the left of the image region 303 in the transformed image 300, which new image regions are significantly more compressed in the horizontal direction than the image regions 301 and 303. By way of example, the compression in the image region 305 is greater than the compression in the image region 301 by a factor of 5.

In addition to the horizontal shift of the presentation of the region of interest 111 or of the image region 301, a vertical shift is also possible as an alternative or in addition thereto. In some embodiments, additional image regions are displayed above the image regions 301 and 303, in which additional image regions the surroundings 105 are presented with greater compression in the vertical direction than in the image regions 301 and 302 or 305.

The transition between the two image regions directly adjoining one another in each case is designed to be as continuous as possible according to embodiments. To this end, for example, the compression factor between the image regions does not change abruptly from one pixel to the adjacent pixel but changes continuously over a plurality of pixels. Here too, the image regions 301 to 306 can be repositioned accordingly. According to an exemplary embodiment, the input image is distorted or rectified prior to the transformation, for example lens-rectified.

In some embodiments, the image may be composed or stitched from a plurality of different camera input images prior to the transformation. By way of example, the input image of a first camera is used for image regions 301, 302 and 305 and the input image of a second camera is used for the image regions 303, 304 and 306. The overall image 400 on the monitor 104 always shows the greatest possible proportion of the surroundings 105 not covered by a presentation of the trailer 109. Consequently, maneuvering, in particular, is made easier, for example when parking.

Objects at the end of the trailer 109 are seen better by the magnification in the image region 301. When the trailer 109 is at an angle, the risk to persons in the vicinity of the motor vehicle 101 is reduced. The region in the vicinity of the motor vehicle 101 is presented in magnified fashion in the image region 301 and therefore presented on the monitor 104 with as little compression as possible. On account of the option of manually choosing the region of interest 111, all of the image information of the camera 102 is made accessible to the driver, in particular also the outer regions of the image of the camera 102 in high resolution.

Overall, the field of view presented on the monitor 104 of the camera-monitor system 100 is improved in the case of significant articulation angles between the tractor 108 and the trailer 109.

What is claimed is:

1. A method for operating a camera-monitor system for a motor vehicle, wherein the camera-monitor system has a side camera assigned to a longitudinal side of the motor vehicle to provide an image of surroundings of the motor vehicle, wherein the motor vehicle includes a towed portion articulating in relation to a driver's cabin, the method comprising:
   specifying a region of interest in the surroundings, the region of interest defined in relation to the towed portion; and
   transforming the image of the camera into a transformed image;
   changing the location of the motor vehicle in relation to the surroundings;
   maintaining the region of interest in the transformed image in a specified image region with a specified magnification independent of the change in relative position between the surroundings and the motor vehicle.

2. The method as claimed in claim 1, wherein specifying the region of interest comprises:
   ascertaining a specified image content;
   ascertaining vehicle data; and
   specifying with an input apparatus.

3. The method as claimed in claim 1, wherein the region of interest includes a rear edge of a trailer attached to the motor vehicle.

4. The method as claimed in claim 1, further comprising:
   transforming the image such that specified regions of the surroundings in the transformed image have different magnifications in specified image regions; and
   changing the respective positions of the image regions in the transformed image based on a change in the relative position of the region of interest.

5. The method as claimed in claim 4, further comprising transforming the image with a continuously changing compression factor so a continuous transition is presented between image regions immediately adjoining one another.

6. The method as claimed in claim 1, further comprising transforming the image into the transformed image so surroundings presented in the transformed image remain unchanged and independent of a change in the relative position of the region of interest in the surroundings.

7. The method as claimed in claim 1, further comprising rectifying the image prior to the transformation.

8. The method as claimed in claim 1, further comprising composing the image from a plurality of input images.

9. The method as claimed in claim 1, wherein the camera-monitor system comprises two cameras assigned to a common longitudinal side of the motor vehicle;
   wherein each of the two cameras provides a respective image of the surroundings of the motor vehicle; and
   the respective images of the two cameras partly overlap.

10. A camera-monitor system for a motor vehicle, wherein the motor vehicle includes a towed portion articulating in relation to a driver's cabin, the system comprising:
    a side camera assigned to a longitudinal side of the motor vehicle to provide an image of surroundings of the motor vehicle; and
    a processor programmed to:
    specify a region of interest in the surroundings, the region of interest defined in relation to the towed portion; and
    transform the image of the camera into a transformed image; and
    maintain the region of interest in the transformed image in a specified image region with a specified magnification after a change in relative position between the surroundings and the motor vehicle.

* * * * *